(12) United States Patent
LaGuardia et al.

(10) Patent No.: US 7,798,706 B2
(45) Date of Patent: Sep. 21, 2010

(54) TEMPERATURE-INDICATING CONTAINER (75) Inventors: Wendy LaGuardia, Randolph, NJ (US); Donald LaGuardia, Jr., Wayne, NJ (US)

(73) Assignee: Cups Unlimited, LLC, Randolph, NJ (US)

(*) Notice: Subject to any disclaimer, the term of this patent is extended or adjusted under 35 U.S.C. 154(b) by 1030 days.

(21) Appl. No.: 11/468,186

(22) Filed: Aug. 29, 2006

(65) Prior Publication Data

US 2007/0053406 A1    Mar. 8, 2007

Related U.S. Application Data

(60) Provisional application No. 60/715,729, filed on Sep. 8, 2005.

(51) Int. Cl.
*G01K 1/00* (2006.01)
*G01K 11/00* (2006.01)

(52) U.S. Cl. .................. 374/157; 374/150; 374/159; 116/216

(58) Field of Classification Search .............. 374/157, 374/150, 159; 116/216
See application file for complete search history.

(56) References Cited

U.S. PATENT DOCUMENTS

| | | |
|---|---|---|
| 2,319,101 A | 5/1943 | Anderson |
| 2,357,477 A | 9/1944 | Killman |
| 2,505,037 A | 4/1950 | Frumkin |
| 3,125,984 A | 3/1964 | Okuyama |
| 3,559,484 A | 2/1971 | Kita |
| 3,782,195 A | 1/1974 | Meek et al. |
| 3,822,594 A | 7/1974 | Parker |
| 4,022,060 A | 5/1977 | Rebhan |
| 4,156,365 A | 5/1979 | Heinmets et al. |
| 4,408,905 A | 10/1983 | Ehrenkranz |
| 4,435,344 A | 3/1984 | Iioka |
| 4,832,046 A | 5/1989 | Parrish |
| 4,878,588 A | 11/1989 | Ephraim |
| 4,919,983 A | 4/1990 | Fremin |
| 5,145,107 A | 9/1992 | Silver et al. |
| D343,129 S | 1/1994 | Farley |
| 5,282,683 A | 2/1994 | Brett |
| 5,447,248 A | 9/1995 | Rodriguez et al. |
| 5,482,373 A | 1/1996 | Hutchinson |
| 5,588,747 A | 12/1996 | Blevins |
| 5,720,555 A | 2/1998 | Elele |
| 5,738,442 A | 4/1998 | Paron et al. |
| 6,264,049 B1 | 7/2001 | Shteynberg |
| 6,270,783 B1 | 8/2001 | Slavtcheff et al. |
| 6,324,963 B1 | 12/2001 | Cirasole |
| 6,386,756 B1 | 5/2002 | Rice |

(Continued)

OTHER PUBLICATIONS

International Search Report & Written Opinion in PCT/US2006/033495 (Aug. 2007).

(Continued)

*Primary Examiner*—Lisa M Caputo
*Assistant Examiner*—Mirellys Jagan
(74) *Attorney, Agent, or Firm*—Leydig, Voit & Mayer Ltd.

(57) ABSTRACT

A temperature-indicating container having thermal insulation and a temperature indicator in the side wall or the bottom of the container visible from outside the container. A method for making such a container is also provided.

9 Claims, 4 Drawing Sheets

U.S. PATENT DOCUMENTS

| | | |
|---|---|---|
| 6,422,456 B1 | 7/2002 | Sadlier |
| 6,513,379 B2 | 2/2003 | Meyers et al. |
| 6,544,614 B1 | 4/2003 | Huffer et al. |
| 6,579,006 B1 | 6/2003 | Pariseau |
| 6,925,872 B2 | 8/2005 | Hadala |
| 6,979,120 B1* | 12/2005 | Wolfe ........................ 374/162 |
| 2002/0097777 A1 | 7/2002 | Ronci |
| 2002/0097778 A1* | 7/2002 | Moroskat et al. ............ 374/162 |
| 2002/0167989 A1 | 11/2002 | Russo |
| 2002/0170917 A1 | 11/2002 | Gallo |
| 2003/0000451 A1 | 1/2003 | Wilcox |
| 2008/0087674 A1* | 4/2008 | Overgaard ............. 220/592.16 |
| 2008/0283538 A1* | 11/2008 | Rowen ........................ 220/739 |
| 2009/0183669 A1* | 7/2009 | Scott et al. ................... 116/216 |

OTHER PUBLICATIONS

Temperature Label (www.temperaturelables101.com) (2005).
Temperature Labels (www.tiptemp.com) (2005).

* cited by examiner

TEMPERATURE-INDICATING CONTAINER

This application claims the benefit of Provisional Application No. 60/715,729, filed Sep. 8, 2005, which is incorporated herein by reference.

BACKGROUND OF THE INVENTION

Field of the Invention

When hot beverages are purchased for immediate consumption, they are most often sold in a disposable, insulated cup. Because the cup is insulated, it is very difficult for the consumer to know if the beverage is too hot for consumption, unless they feel the contents. Hot beverages, such as coffee or tea, can be served at such a high temperature that they have the potential to scald or burn the mouth, lips or other parts of the body if spilled. A similar situation exists when other liquids or solids are sold or prepared at home in a disposable, insulated cup, such as hot soup or hot chili. The consumer does not know if the contents are too hot to be consumed.

Also, a similar situation exists when the contents of a cup or container are heated in a microwave. The consumer does not know if the contents were heated to an unacceptable level for consumption.

As beverage and food consumption purchased and consumed "on the go" via fast food restaurants and coffee houses continues to rise, the need to inform consumers of the temperature of their beverage or food prior to consumption becomes more important toward eliminating this type of injury, and as a consequence of such, lawsuits and liability issues.

Likewise, as food and beverages are often re-heated in microwaves, the need to identify the temperature of the contents of a cup or container prior to consumption is critical toward eliminating these same injuries, especially as more small children use the microwave.

U.S. Design Pat. No. 343,129 to Farley discloses an ornamental design for a temperature measuring cup that has a thermometer on its outer surface. This design, however, is not adequate for handling hot foods mentioned above, because a consumer can be burned on contact with the cup.

U.S. Pat. No. 4,919,983 to Fremin discloses a container for feeding infants, which has a body formed by blow molding from a thermoplastic, light-permeable material. The container is shaped like a baby bottle or cup and contains, in formulation, along with the thermoplastic material, a thermochromic composition consisting of from 5 to 10 percent by weight. This combination permits the container to undergo a distinct change in color when the temperature of the contents within it exceeds a given threshold providing a conspicuous indication of the liquid contents if above the human zone of comfort. Another embodiment incorporates the thermochromic composition in the middle composite of a multi-layered polyethylene bag for use with baby feeding container having a rigid outer enclosure and a polyethylene liner bag. Like the cup in U.S. Design Pat. No. 343,129, this container is not suitable for handling hot foods for substantially the same reasons.

U.S. Pat. No. 5,282,683 discloses a plastic cup for measuring the temperature of urine using a thermometer insert mounted to an elongated backing member. The elongated backing member is resilient and "springs" back to its normally flat condition if bent. The thermometer is inserted into the container that has an opening such that the thermal scale member is capable of being observed through the container wall. This design, however, is not suitable for handling hot liquids.

U.S. Pat. No. 5,588,747 to Blevins discloses a measuring cup with a thermometer mounted on an exterior surface thereof for measuring the temperature of a liquid prior to placing it in the cup. The cup can be used in many operations involving a liquid that have a critical temperature requirement. One such operations is bread making in which water, once it has been warmed to a desired temperature, is added to yeast or, alternately, to a flour mixture containing yeast. To use the cup in bread making, the cup is placed under a stream of warm water and, when the thermometer indicates the water has reached the desired temperature, the water in a measured amount is added to the cup. This cup is not designed to measure the temperature of its contents, making it unsuitable for many different applications related to consumption of hot beverages, as discussed above.

U.S. Pat. No. 5,720,555 to Elele discloses a temperature indicating container apparatus that includes an inner container portion made from substantially heat insulating material. A thermochromic-substance-containing portion is juxtaposed against an outside surface of the inner container portion, such that color changes of the thermochromic-substance-containing portion can be seen from outside the inner container portion. The thermochromic-substance-containing portion may be in a form of a jacket around the outside surface of the inner container portion. The jacket may include a plurality of windows. An outermost container portion may be located outside both the thermochromic-substance-containing jacket and the inner container portion. The outermost container portion is light transmissive, such that color changes of the thermochromic-substance-containing jacket can be seen from outside the outermost container portion. A bridge element bridges top portions of the inner container portion and the outermost container portion. This design is ineffective for indicating accurate temperature of a liquid inside the container.

U.S. Pat. No. 6,264,049 to Shteynberg discloses a nursing bottle for handling liquid foods and for feeding infants having a main side wall formed as a hollow shell with an attached elongated hollow appendix compartment propagated into the inner chamber of the bottle. The hollow appendix compartment contains a device for temperature sensing, which allows to determine the temperature of liquid foods inside the bottle. This design, however, is inadequate for handling hot liquids due to the lack of thermal insulation. Furthermore, formation of a hollow appendix compartment for holding the thermometer involves an expensive and complicated process, making the container impractical, particularly if is to be disposable.

U.S. Pat. No. 6,386,756 to Rice discloses a cup for indicating the temperature of the contents thereof and a method of making the same. The cup includes a body that is cup-shaped and a temperature sensitive strip that is disposed on the body and indicates the temperature of the contents thereof. The body, however, includes two cups, an inner cup that is disposed in, and is in intimate contact with, an outer cup. The use of two cups for the body makes this product expensive to produce, both in terms of materials utilized and the formation process. Furthermore, there is a possibility that these cups can separate, which may result in various injuries, for example, scolding, if a hot liquid is in the cup.

It is apparent that various temperature measuring containers, the representative examples of which are discussed above, have been disclosed. However, these containers are either not suitable for the purposes of the present invention or are too expensive and/or complicated to produce. Thus, there is a need for a temperature-indicating container that is safe for handling hot liquids, inexpensive and easy to produce and accurate in measuring the temperature of the liquid inside the cup.

SUMMARY OF THE INVENTION

A disposable container that indicates the temperature, temperature range, or degree of hotness of the contents therein and a method of making it are provided. The container has a temperature sensitive indicator that indicates the temperature, temperature range, or degree of hotness of the contents therein, and can be observed by the consumer by looking at the outside of the container.

When the consumer views the temperature, temperature range, or degree of hotness on the outside of the container, the consumer can then decide if the contents of the container are at an acceptable temperature level for consumption. If the contents are too hot to consume, the consumer can wait until the temperature falls to an acceptable level. The temperature indicator preferably adjusts to the changing temperature to reflect the new temperature, temperature range or degree of hotness. In this way, the consumer can wait until their optimal, preferred temperature is reached and displayed on the temperature indicator. Since consumers have different heat preferences and tolerance levels, each consumer can make an individual decision as to what temperature, temperature range or degree of hotness is best for them to consume the contents of the cup or container.

BRIEF DESCRIPTION OF THE DRAWINGS

The features and advantages of this invention will be apparent from the description of drawings and the detailed description immediately following.

DETAILED DESCRIPTION OF THE INVENTION

The present invention provides a temperature-indicating container that is safe to use with hot liquids, sufficiently accurate in measuring the temperature of the liquid inside the container and is easy and inexpensive to produce, making it possible for this container to be disposable. This is achieved by placing a thermal indicator in the side wall or bottom of the container, either in thermal contact with a liquid or in thermal contact with a thermally conducting part of the side wall or bottom. The thermal indicator, such as a thermometer, may be placed in the opening of the thermally insulated part of the side wall, so that it is visible from outside the container.

As used in the context of the present invention, a "container" has a side wall and a bottom member that define a space capable of holding a liquid. The container is preferably cup-shaped and is capable of holding liquids at various temperatures, ranging from the freezing point to the boiling point. For example, based on the materials selected, the container can preferably hold liquid in a temperature range of about 0° C. to about 100° C. Preferably, in such a case, the container is a cup made of paper stock with at least one layer of Styrofoam® adhered, laminated and/or foamed on its outer surface for thermal isolation.

As used herein, a "side wall" is a wall of the container, which has one or more layers made from the same or different materials. If more than one layer is present, these layers are laminated, adhered or otherwise attached to each other, making this side wall and the container have a "single container" structure, which is different from the "double cup" structure in the above-mentioned U.S. Pat. No. 6,386,756. The double cup structure in accordance with this patent is made by inserting one cup into another cup, such that the inner cup is in intimate contact with the outer cup. An example of a container with a side wall in accordance with the present invention is, for example, a Dixie® Perfectouch™ cup available from the Georgia Pacific Dixie Company or a three-layered insulated cup available from Insulair, Inc. and described in U.S. Pat. No. 6,422,456.

As used herein, a "thermally insulated" container can preferably be held or touched by human skin without creating a burning sensation when filled with a liquid at a temperature of at least about 70° C., preferably at least about 80° C., more preferably at least about 90° C. The temperature of the thermally insulated container at the point of contact with the skin is preferably at least 20° C. lower than the temperature of the contents in the container when these contents have been in the container for about 30 to 60 seconds, provided that the temperature of the contents in the container is at least 20° C. higher than the ambient temperature.

The thermal insulation can be achieved by selecting materials for and/or controlling the thickness of the side wall. Thermal insulating properties of the container make it unnecessary to provide the container with a handle or any other device in order to avoid being burned. However, such a handle or device may be used, for example, for easier handling, especially for larger-sized containers.

As used herein, a "thermally insulating" material is, for example, a material having a thermal conductivity, at 298K, of less than about 0.1 W/m·K, preferably less than about 0.06 W/m·K, more preferably less than about 0.04 W/m·K. Styrofoam® is an example of such a material. Conversely, a "thermally conductive material" has a thermal conductivity greater than that of a thermally insulating material.

As used herein, a "thermally conducting part" easily transmits heat and allows for a reasonably accurate determination of the temperature of the contents of the container when the temperature indicator is in contact therewith. Preferably, the thermally conducting part is such that the temperatures on both surfaces thereof differ by less than about 5° C. when the container is filled with a liquid having a temperature of at least 70° C. and is left standing for at least 30 seconds at room temperature. The thermally conducting part is preferably cellulose-based (at least 50% by weight cellulose). Preferably, the thermally conducting part is substantially not absorptive. For example, in case of paper stock, a thin layer of polymeric film may be applied to the surface that may come into contact with the liquid to reduce or prevent absorption.

As used herein, a "thermally insulating part" is such that it, either by itself or together with the thermally conducting part, provides the container with the above-discussed thermally insulating properties. While it is preferable to form the thermally insulating part from a thermally insulating material, such a material is not necessarily used. The thickness or porosity, for example, of other types of materials may be varied to achieve desired results.

The thermally insulating part is preferably made from a non-cellulosic material. Such a material contains less than 50% weight cellulose, preferably less than 20% by weight, more preferably less than 1% by weight or no cellulose. Examples of preferable non-cellulosic materials include foamed synthetic polymeric films, such as foamed polystyrene.

Since the thermal insulation and transmission can be controlled by changing the thickness of a material, both the thermally insulating part and the thermally conducting part in accordance with the present invention can be made from the same material. For example, a partial "cut out" from the side wall may make a portion of this side wall sufficiently thin to function as a thermally conducting part in accordance with the present invention. Therefore, the side wall may comprise only a single layer, albeit having a varying thickness.

Several preferred embodiments of the present invention are described below with reference to the drawings.

Figure 1:
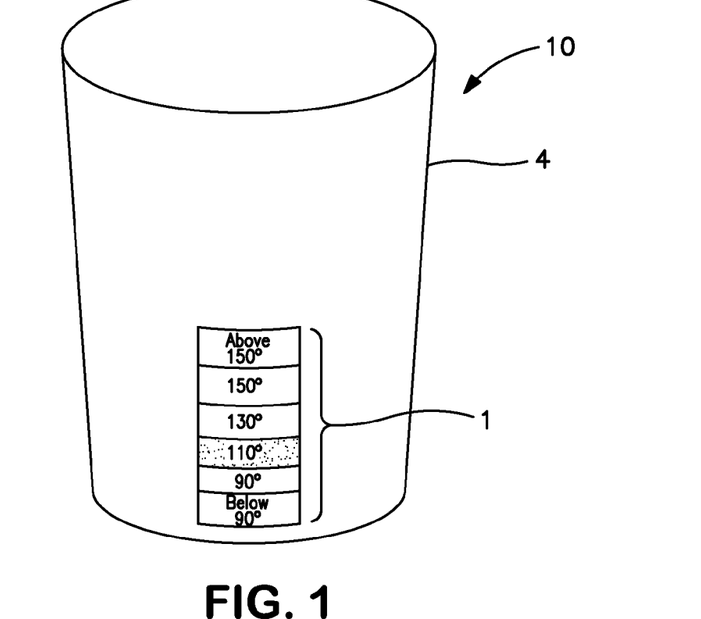
FIG. 1 is a front view of a container in accordance with an embodiment of the present invention from a consumer's perspective.
Figure 2:
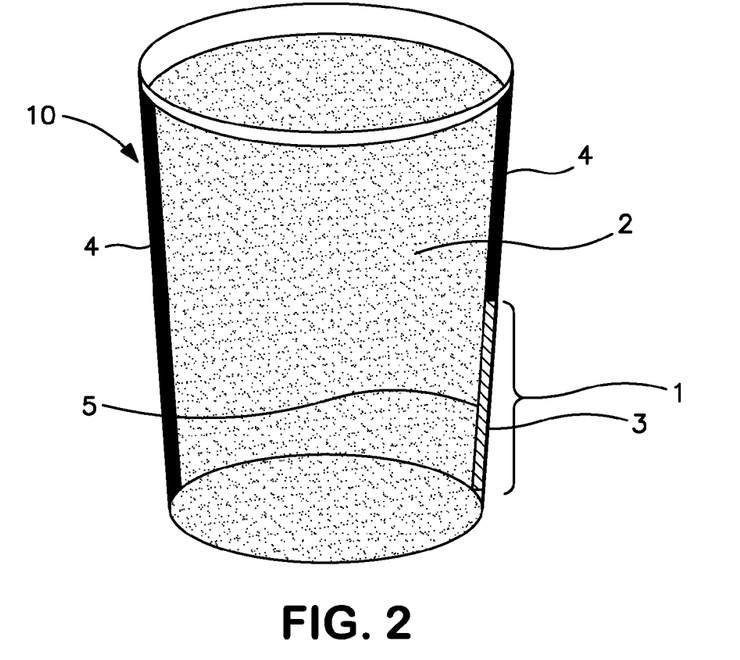
FIG. 2 is a cutaway side view of the container shown in FIG. 1.

FIGS. 1 and 2 show a disposable container that is mostly insulated for the purpose of holding hot beverages or food. While this container is shown in the form of a cup, various other shapes are within the scope of the present invention. Also, the dimensions (e.g., height, length, thickness, etc.) of different components (e.g., the temperature indicator, layers, etc.) in FIGS. 1 and 2, as well as in the other figures, are depicted for demonstrative purposes only, and their actual dimensions and dimensional relationships are not necessarily as shown in the figures.

Referring to FIG. 2, the cup or container has an insulation layer 4. This insulation layer has an opening in which temperature indicator 1 is located. The inner part 5 of the temperature indicator 1, which is used to detect the temperature, is capable of being in direct contact with the contents 2 placed in the cup 10. Preferably, this inner part 5 is not in contact with the insulating part of the container. However, for example, four edges of the temperature indicator may be in contact with the insulation layer of the cup solely for the purpose of sealing the temperature indicator to the cup. The outer part 3 of the temperature indicator 1, which contains a temperature scale or the like, is visible to the consumer from outside the container and can be directly touched by the consumer. If desired, the container may be formed so that insulation or another material or layer is placed over the outer part 3, for example, in order to prevent accidental burns. However, such insulation, material or layer should not prevent the reading of the temperature indicator.

In this embodiment, heat is conducted by the contents of the container directly to the temperature indicator, and not through any part of the cup or container, in order to more accurately measure the temperature or temperature range. The opening for the temperature indicator can be anywhere on the cup or container, as long as the inner part of the temperature indicator is capable of being in contact with the contents of the cup or container when filled. Preferably, this opening is located where the contents of the cup or container are likely to be in contact with the indicator with minimal filling. The outer part of the temperature indicator is preferably visible to the consumer for the purposes of displaying the temperature.

The cup as shown in FIGS. 1 and 2 can be manufactured in such as way as to create the entire insulating cup or container and cut out a small area from the cup or container. The small "cut out" area or opening should preferably substantially match the size of the temperature indicator. The temperature strip can then be applied and sealed to the container in the area of the "cut out." The inner part of the temperature indicator should be in contact with the contents of the container, when filled, and the outer part of the temperature indicator should be visible to the consumer for the purposes of displaying the temperature or the like. While FIG. 1 depicts the cup or container with a temperature in a form of a strip that has temperature numbers, various types of temperature indicators, such as those that convey temperature range, degree of hotness indicia, and the like, may be used.

The cup or container and temperature indicator are manufactured to form a single unit. The temperature indicator in this embodiment is preferably applied during the manufacturing process and not by the consumer.

Furthermore, in this embodiment, the temperature indicator is not intended to be removed from the cup or container. The temperature indicator may be placed in any position on the cup or container (e.g. vertically, horizontally, diagonally).

In this embodiment, the temperature indicator is preferably affixed to the container using an adhesive, which is food-safe. A listing of appropriate food-safe compounds may be found in Title 21, Chapter I, Section 175.105, of the Code of Federal Regulations. Preferably, the adhesive employed in accordance with the present invention is of the type typically used to seal disposable cups intended for hot liquids. Such an adhesive is food-safe and can be exposed to a high temperature environment when a hot liquid is placed into the cup. Furthermore, it is already available to cup manufacturers, resulting in lower production costs. Other examples of suitable adhesives include polysiloxane-based Silirub® adhesives available from Soudal Nev., Turnhout, Belgium, and EP48 epoxy, available from Masterbound, Inc., Hackensack, N.J.

Figure 3:
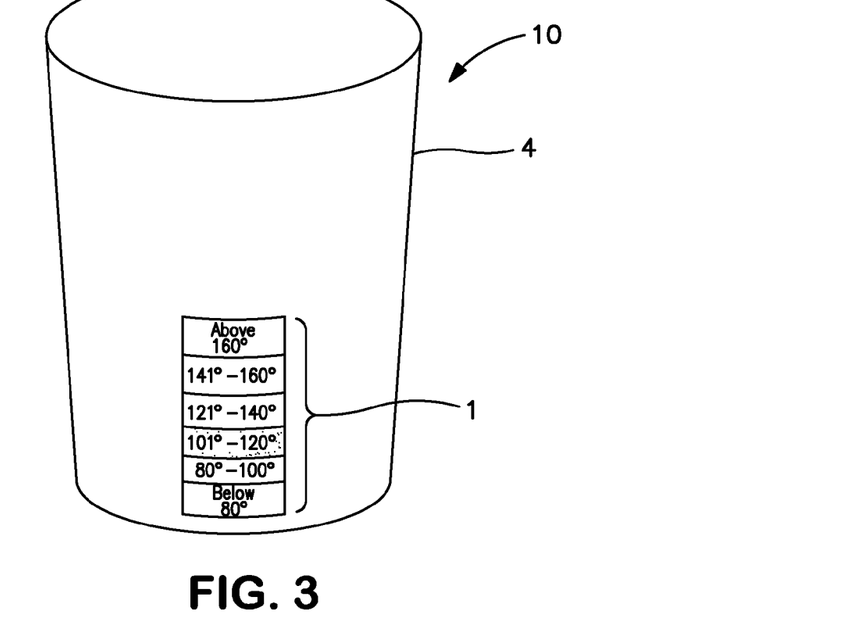
FIG. 3 is a front view of a container in accordance with another embodiment of the present invention from a consumer's perspective.
Figure 4:
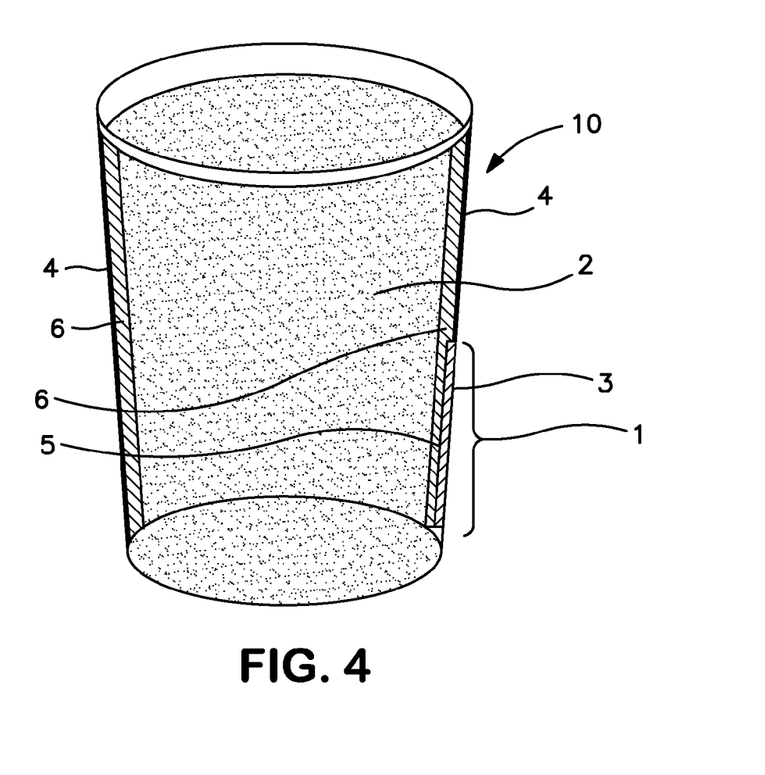
FIG. 4 is a cutaway side view of the container shown in FIG. 3.
Figure 5:
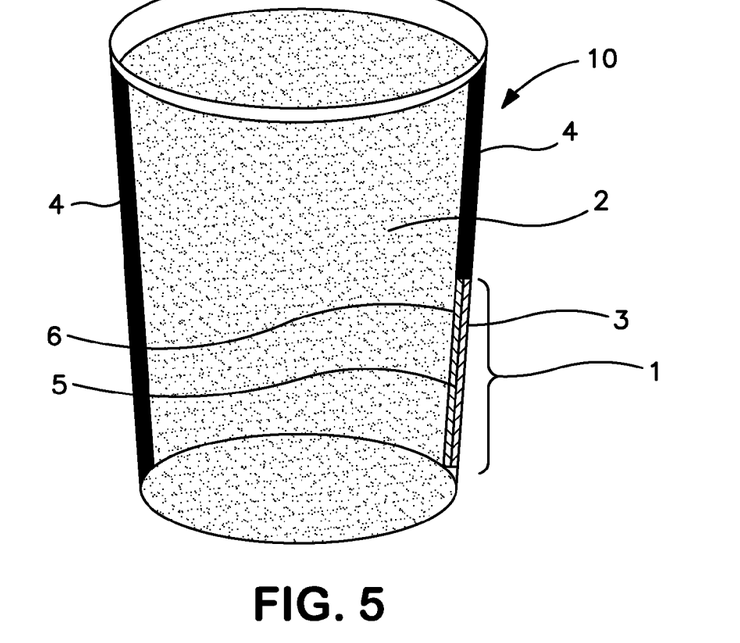
FIG. 5 is a cutaway side view of another embodiment of the container shown in FIG. 3.

Another embodiment of a container in accordance with the present invention is shown in FIGS. 3-5. In this embodiment, a container in the form of a cup has a thermally insulating part 4 and a thermally conducting part 6. Preferably, the container is mostly insulated for the purpose of holding hot beverages or food. The temperature indicator 1 is in thermal contact with a thermally conducting part 6. In particular, the inner part 5 of the temperature indicator 1 is in contact with a thermally conducting part 6. The outer part of the temperature indicator can be touched directly by the consumer. Heat is conducted through the thermally conducting part of the container to the temperature indicator in order to measure the temperature, temperature range or degree of hotness of the contents of the container.

The thermally conducting part can be located anywhere on the container as long as the thermally conducting part is capable of being in contact with the contents of the container when filled, and the temperature indicator is in thermal contact with the thermally conducting part of the container. The thermally conducting part of the container is preferably located where it is likely to be in contact with the contents of the container with even minimal filling.

This structure in accordance with the present invention can be manufactured in such a way as to create the entire insulating cup or container and "cut out" a small area from the cup or container. A thermally conductive material would be placed over the "cut out" and then the temperature strip would be applied to the thermally conducting part or the thermally conducting part can be applied first to the temperature indicator and then together, the thermally conducting part and the temperature indicator can be applied and sealed to the "cut out" area of the cup or container. The small "cut out" area should preferably substantially match the size of the temperature indicator. The thermally conducting part of the container should be in contact with the contents and the inner part of the temperature indicator, and the outer part of the temperature strip should be visible from outside the container.

In another embodiment, the entire, or substantially the entire, inner surface of the container may be a part of a thermally conducting part. A thermally insulating part may be adhered to, laminated on or attached to the thermally conducting part. This structure, however, as discussed above, differs from a double-cup construction disclosed in U.S. Pat. No. 6,386,756, which has various disadvantages. In particular, the use of two cups in this patent increases the thickness of the container, as well as the cost and complexity of its production. Furthermore, the inner and outer cup may separate and lead to injuries, particularly if the contents of the cup are hot.

The present invention, as discussed above, utilizes a single container construction, making the modification of existing products and manufacturing methods simpler and less expensive than generally would be needed to implement a double-cup construction. For example, such a container may be structured similarly to a thermoplastic resin foam covered paper cup disclosed in U.S. Pat. No. 4,435,344, which is incorporated herein by reference, modified to include a temperature indicator. This cup is formed by placing a thermoplastic resin film on a paper container and heating the container to foam the film, creating a thermally isolating layer. In order to form a container in accordance with the present invention, a temperature indicator may be incorporated into the cup during the manufacturing process.

For example, a temperature indicator may be adhered on one surface of a paper sheet having, for example, a basis weight of 240 g/m$^2$ and a moisture content of 7%. A low density polyethylene may be extrusion-coated in a thickness, for example, of about 20 microns on the same surface. The sheet can then be shaped into a container form using a conventional cup-making machine, with the coated surface being the outer surface.

The total thickness of the paper sheet with the polyethylene film may be, for example 0.34 mm. This paper container may then be heated in an electric oven at a temperature of about 135° C. for about 2 minutes to foam the polyethylene, forming a foamed thermally-insulating layer on the outer surface. Since the temperature reading on the temperature indicator should be visible from outside the cup, the indicator may be masked during the application of the polyethylene film. Alternatively, a part of the paper sheet may be masked and the temperature indicator may be attached to the paper before or after the foaming. The latter process is preferred if the temperature indicator is not reversible, or if it may be damaged during the coating and/or foaming process. However, if the temperate indicator can tolerate the film-forming and foaming processes, the film may be used to hold the temperature indicator in place in lieu of an adhesive and the like. This arrangement can provide a more accurate temperature reading. It will be understood that various modifications of this process are possible in order to obtain the desired structure.

For example, a container having its outer surface laminated or coated with a thermoplastic film may be prepared by blanketing a side wall member from a sheet made from, for example, paper, one surface of which is coated or laminated with a thermoplastic synthetic resin film or an aluminum foil. A bottom panel member is blanked out from this sheet or another sheet having no film or foil. These sheets are fabricated into a container by using a conventional cup-forming machine so that the coated surface faces outward.

The thermoplastic synthetic resin layer of the so-manufactured container is then heated to foam it and form a heat-insulating layer on the outer surface of the container. The temperature indicator may be applied to the sheet before the resin and/or may be masked as discussed above.

Alternatively, a container is fabricated from a body member and bottom panel member blanked out from a sheet (e.g., a paper sheet) having no thermoplastic synthetic resin film or other layer. The outer surface of the container is coated with a prepolymer of thermoplastic synthetic resin by spraying it and then the prepolymer is cured by applying ultra-violet rays to form a film in situ. The film on the wall surface of the so-formed container can then be heated to foam it and form a heat-insulating layer. Again, the temperature indicator may be applied to the sheet before prepolymer and/or may be masked as discussed above.

Alternatively, a heat-insulating paper container of this invention may be prepared as follows. A body blank is cut out from a sheet (e.g., a paper sheet) one surface of which is coated or laminated with a thermoplastic synthetic resin film and then heated to foam the thermoplastic synthetic resin film to thereby form a thermal insulating layer. Alternatively, this sheet is heated to foam the thermoplastic synthetic resin film, and a body blank having a foamed heat-insulating layer is cut out from the heated sheet. A bottom blank is cut out from a sheet (e.g., a paper sheet) at least one surface of which is coated or laminated with a thermoplastic synthetic resin film or an aluminum foil, or one surface of which is coated or laminated with a thermoplastic synthetic resin film and the other surface of which is coated or laminated with the same or different thermoplastic synthetic resin film or an aluminum foil, or which is neither coated nor laminated with such materials. Then, this blank is optionally heated, if the sheet has the thermoplastic synthetic resin film, or alternatively, a sheet (e.g., a paper sheet) one surface of which is coated or laminated with a thermoplastic synthetic resin film and the other surface of which is coated or laminated with the same or different thermoplastic synthetic resin film or an aluminum foil is optionally heated to foam the thermoplastic synthetic resin film to thereby form a thermal insulating layer. A bottom blank having a foamed thermal insulating layer is cut out from the heated sheet. The body blank having a thermal insulating layer on the outer surface and the bottom blank having or not having a thermal insulating layer are then fabricated into a thermal insulating paper container with a conventional cup-making machine. Again, the temperature indicator may be applied as discussed above, with or without masking.

In all of the above-discussed methods, a portion of the surface of the side wall that will face the space for holding the contents of the container may be masked and the same or different thermal insulation may be applied to the rest of this surface. The masked portion, preferably, substantially matches the size of the portion of the surface with which the temperature indicator is in thermal contact, in order to more accurately detect the temperature of the container contents.

Thermoplastic synthetic resin films, which may be used in accordance with the present invention, include polyethylene, polypropylene, polyvinyl chloride, polystyrene, polyester, nylon and the like. Polystyrene is preferred. The term "polyethylene" includes low, medium and high density polyethylenes.

Various types of temperature indicators, such as temperature strips, may be used in the context of the present invention. Preferably, the temperature indicator is sufficiently thin so that it can be incorporated into the wall of the container without creating a protrusion. More preferably, the temperature indicator (with or without any external layer thereon) is flush with the outer surface of the container. Also, preferably, the temperature indicator is reversible and the temperature readout adjusts as the temperature of the contents of the container changes. However, non-reversible indicators may also be used.

In the embodiment where the temperature indicator may come into direct contact with the contents of the container, this indicator preferably is food safe. The inner part 5 of the temperature indicator in accordance with the present invention may comprise at least one layer of a material, which preferably does not substantially affect the accuracy of the temperature reading (e.g., by less than about 5° C.). Preferably, the material used is food safe, particularly in view of a possibility of being in contact with hot, acidic liquids. Examples of such materials include paper that is generally used in making disposable paper cups and thin polymeric films.

Figure 6:
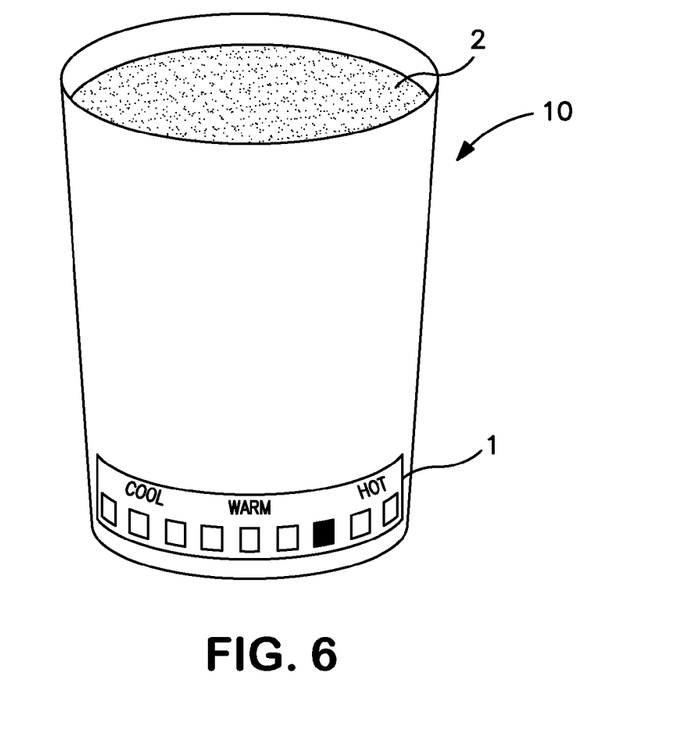
FIG. 6 is a front view of a container in accordance with yet another embodiment of the present invention from a consumer's perspective.

While FIGS. 1-5 depict a cup-shaped container with a temperature indicator that is in the form of a vertical temperature strip that has temperature ranges, other variations of temperature strips, such as those that convey temperature numbers or have degree of hotness indicia (e.g., color or labels, such as cool, warm, hot, etc.) as shown in FIG. 6 and the like may be used. The temperature indicator in all embodiments may monitor the temperature using one or more heat-sensitive indicators, such as a liquid crystal-type thermometer. Any one of the embodiments can also indicate multiple temperatures or temperature ranges, such as the current temperature, the temperature or temperature range immediately above the current temperature, and the temperature or temperature range immediately below the current temperature, if desired. The specific design and artistry in which the temperature numbers, temperature ranges or degree of hotness are displayed to the consumer can vary based on preferences utilizing different colors, styles, and the like. Some temperature indicators for use in the present invention can be purchased from Technical Industrial Products, Cherry Hill, N.J.

The temperature indicator can be placed in any position on the cup or container (i.e. vertically, horizontally, diagonally). Preferably, the temperature indicator is located not higher than the midpoint, more preferably not higher than one third of, the side wall of the container, so that the temperature information can be obtained with minimal filling. Also, the temperature indicator may be formed into the bottom of the container in the same way as discussed above with respect to the side wall.

The container and temperature indicator can be manufactured so that the temperature indicator is applied by the consumer. This is most suitable in the embodiment where the temperature indicator is in thermal contact with the thermally conducting part of the container. Such a container may be manufactured as discussed above, with a portion of the thermally conducting part exposed. The temperature indicator may, for example, have an adhesive layer on its rear surface or the conducting part may have an adhesive thereon, allowing the indicator to be attached. The adhesive used for this type of application may be, for example, a contact or a pressure sensitive adhesive. Useful pressure sensitive adhesives include various silicone pressure adhesives available from Dow Corning, such as Dow Corning® 280A, Dow Corning® 282, and the like. If the adhesive is to come in contact with or be on a thermally conductive part, this adhesive is preferably heat resistant to at least a temperature of the expected contents of the container.

Figure 7:
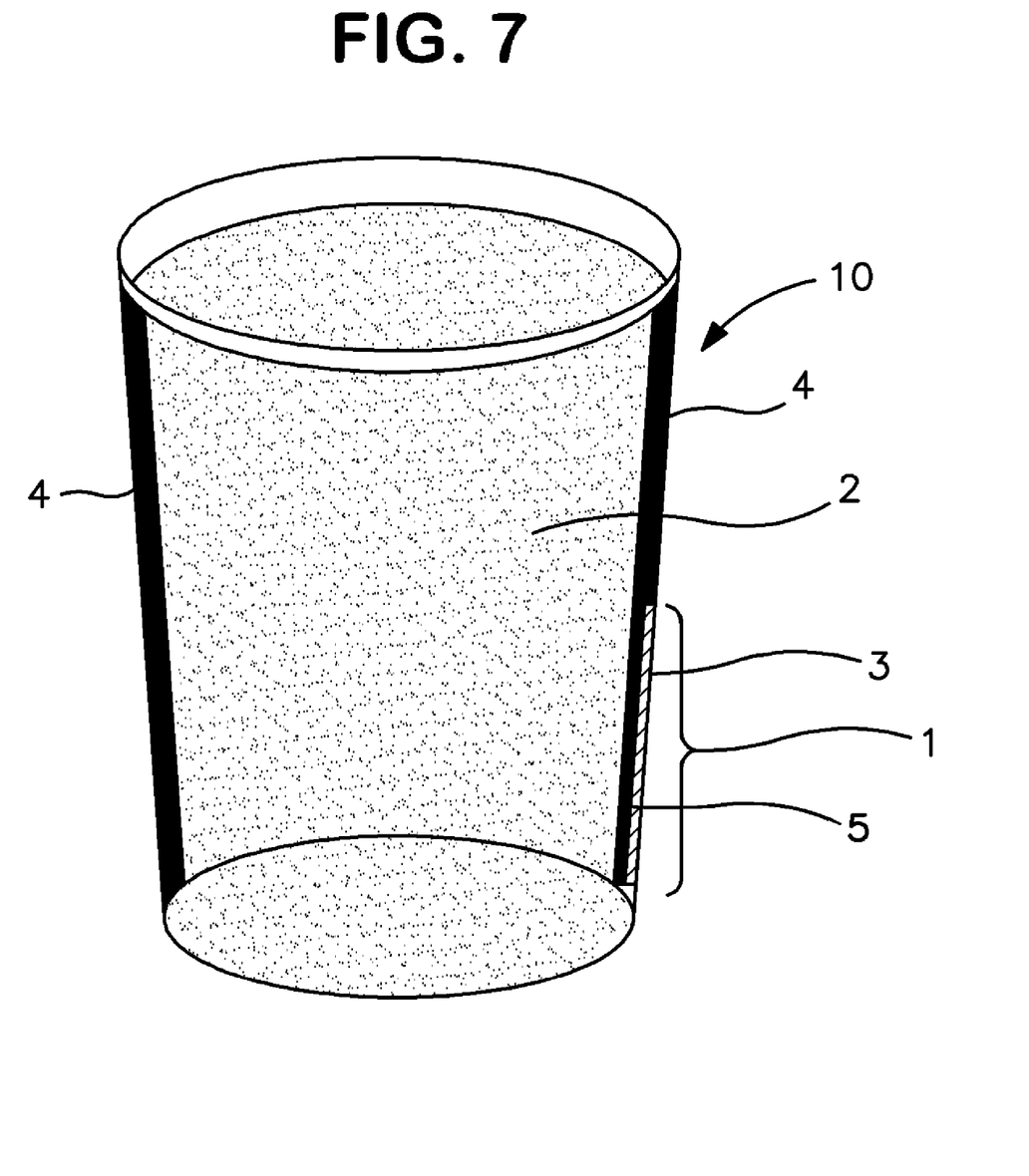
FIG. 7 is a cutaway side view of a container in accordance with yet another embodiment of the present invention.

In another embodiment, as shown in FIG. 7, the entire, or substantially the entire, container may be thermally insulated for the purpose of, for example, holding hot beverages or food. The temperature indicator may be placed directly on any insulated outer surface of the container so that it is visible to the consumer for the purposes of displaying the temperature or degree of hotness. The outer part 3 of the temperature indicator 1 may be touched directly by a consumer.

The temperature indicator in this embodiment is calibrated to account for the thermal insulation provided by the container so that the temperature or degree of hotness of the contents in the container can be accurately conveyed. The calibration of the temperature indicator can take into account the specific insulating properties, compounds, thickness, etc., of the container. The amount of heat that a particular container absorbs can be calculated based on these characteristics, and the temperature or degree of hotness scale on the temperature indicator can be offset accordingly.

While the invention has been described in conjunction with the detailed description thereof, the foregoing description is intended to illustrate and not limit the scope of the invention, which is defined by the appended claims. Other aspects, advantages and modifications are within the scope of the following claims.

What is claimed is:

1. A method for producing a temperature-indicating, thermally insulated container having a single container structure comprising a bottom member and a side wall, at least the side wall having a thermally conducting part and a thermally insulating part, and a temperature indicator, the method comprising the steps of:
    forming the side wall having an inner surface and an outer surface and the bottom member having an inner surface and an outer surface;
    providing a material for forming the thermally conducting part;
    masking an area on the material for forming the thermally conducting part with a mask;
    laminating, adhering, coating or attaching at least one layer of a material for forming the thermally insulating part on the material for forming the thermally conducting part;
    removing the mask;
    affixing the temperature indicator such that it is in the side wall or on the outer surface of the side wall and is visible from outside the container, and such that the temperature indicator is in thermal contact with the thermally conducting part and is affixed in the area on the material for forming the thermally conducting part that was masked in the masking step.

2. A method for producing a temperature-indicating, thermally insulated container having a single container structure comprising a bottom member and a side wall, at least the side wall having a thermally conducting part and a thermally insulating part, and a temperature indicator, the method comprising the steps of:
    forming the side wall having an inner surface and an outer surface and the bottom member having an inner surface and an outer surface; and
    affixing the temperature indicator such that it is in the side wall or on the outer surface of the side wall and is visible from outside the container, and such that the temperature indicator is in thermal contact with the thermally conducting part;
    wherein the step of affixing the temperature indicator comprises laminating, adhering or attaching the temperature indicator on the material for forming the thermally conducting part; masking the temperature indicator with a mask; laminating, adhering, coating or attaching at least one layer of a material for forming the thermally insulating part on the material for forming the thermally conducting part; and removing the mask.

3. The method according to claim 2, wherein the thermally conductive material is in a form of a sheet.

4. The method according to claim 3, comprising shaping the sheet into the side wall after laminating, adhering or attaching the temperature indicator thereto.

5. The method according to claim 3, comprising shaping the sheet into the side wall after laminating, adhering, coating or attaching the at least one layer of the material for forming the thermally insulating part thereto.

6. A method for producing a temperature-indicating, thermally insulated container having a single container structure comprising a bottom member and a side wall, at least the side wall having a thermally conducting part and a thermally insulating part, and a temperature indicator, the method comprising the steps of:

forming the side wall having an inner surface and an outer surface and the bottom member having an inner surface and an outer surface; and affixing the temperature indicator such that it is in the side wall or on the outer surface of the side wall and is visible from outside the container, and such that the temperature indicator is in thermal contact with the thermally conducting part;

wherein the step of affixing the temperature indicator comprises providing a sheet of material for forming the thermally conducting part; laminating, adhering or attaching the temperature indicator on the sheet of material for forming the thermally conducting part; laminating, adhering, coating or attaching at least one layer of a material for forming the thermally insulating part on the material for forming the thermally conducting part and, optionally, over the temperature indicator such that the temperature indication is visible from outside the container; and forming a thermoplastic synthetic resin film on the sheet.

7. The method according to claim 6, wherein the temperature indicator is laminated, adhered or attached prior to the thermoplastic resin film being formed.

8. The method according to claim 6, further comprising a step of foaming the thermoplastic synthetic resin film.

9. The method according to claim 6, wherein the material for forming the thermally conductive part is paper and the thermoplastic synthetic resin film is polystyrene.

\* \* \* \* \*